(12) United States Patent
Foster et al.

(10) Patent No.: US 6,631,010 B1
(45) Date of Patent: Oct. 7, 2003

(54) WEB-BASED IMAGING SYSTEM UTILIZING "COOKIES" TO PROVIDE A SINGLE-ACTION PRINTING OPTION

(75) Inventors: Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 465 days.

(21) Appl. No.: 09/712,309

(22) Filed: Nov. 13, 2000

(51) Int. Cl.[7] .......................... G06F 15/00; G06K 15/00
(52) U.S. Cl. ....................... 358/1.15; 358/1.1
(58) Field of Search ....................... 358/1.1, 1.9, 1.13, 358/1.14, 1.15, 1.18; 709/208, 220, 229, 301, 303; 710/8, 10, 62, 102, 104

(56) References Cited

U.S. PATENT DOCUMENTS

| | | | |
|---|---|---|---|
| 5,694,618 A | * 12/1997 | Hibino | 710/46 |
| 5,960,411 A | 9/1999 | Hartman et al. | 705/26 |
| 5,974,441 A | * 10/1999 | Rogers et al. | 709/200 |
| 6,020,973 A | * 1/2000 | Levine et al. | 358/1.15 |
| 6,092,053 A | 7/2000 | Boesch et al. | 705/26 |
| 6,098,106 A | 8/2000 | Philyaw et al. | 709/238 |
| 6,119,229 A | 9/2000 | Martinez et al. | 713/200 |
| 6,144,997 A | 11/2000 | Lamming et al. | 709/217 |
| 6,301,586 B1 | * 10/2001 | Yang et al. | 707/104 |
| 6,349,304 B1 | * 2/2002 | Bold et al. | 707/102 |
| 6,405,310 B1 | * 6/2002 | Simpson | 713/1 |

FOREIGN PATENT DOCUMENTS

EP 0851367 A1 * 1/1998

\* cited by examiner

Primary Examiner—Gabriel Garcia
(74) Attorney, Agent, or Firm—James R. McDaniel

(57) ABSTRACT

The user goes to a Web imaging homepage to print a document that was recently submitted to the Web-based imaging system. The user selects a printer from the list of available printers. The user then clicks on the "print one" button located beside the printer selected. If the-user has previously printed to this particular device, the printer will print one page according to last printer settings. If the user has not printed to this particular device, the printer prints one copy based upon a master list of default settings the for that printer, such as SourceTray=AutoSelect, Duplex=None or Printer Default, etc.

5 Claims, 6 Drawing Sheets

WEB-BASED IMAGING SYSTEM UTILIZING "COOKIES" TO PROVIDE A SINGLE-ACTION PRINTING OPTION

FIELD OF THE INVENTION

The user goes to a Web imaging homepage to print a document that was recently submitted to the Web-based imaging system. The user selects a printer from the list of available printers. The user then clicks on the "print one" button located beside the printer selected. If the user has previously printed to this particular device, the printer will print one page according to the last printer settings. If the user has not printed to this particular device, the printer prints one copy based upon a master list of default settings for that printer, such as Source Tray=Auto Select, Duplex= None or Printer Default, etc.

DESCRIPTION OF THE RELATED ART

Presently, in Web-based imaging, in order for the user to print a document, the user clicks on the link provided for the selected printer and a Web page setting forth the operating options of the printer is shown. The user then selects from the various options, those options that the user wants implemented in printing the document. After the options have been selected, the user clicks on the Print button. This causes the Web-based imaging system to begin sending the document to the printer to begin printing according to the requested options. Consequently, a more advantageous printing system, then, would be presented if the number of steps to print a document could be reduced.

Ease-of-use issues are a big concern in the field of Internet applications. Many technologies have been developed in order to make it easier for the user to interact with Web sites. For example, cookies are frequently used. Cookies are pieces of data that can be placed on a hard drive of the user's computer by a Web browser when the user visits a Web site. These cookies make it easier for the user to interact with Web sites that require personal information, such as the user's name and address. The cookie stores the personal information on the user's hard drive and supplies that information to the associated Web site on subsequent visits, so the user does not have to enter the personal information every time.

It is known, in e-commerce systems, to employ a one-click method for placing purchase orders via the Internet. Exemplary of such prior art is U.S. Pat. No. 5,960,411 ('411) to Hartman et al., entitled "Method and System for Placing a Purchase Order Via a Communications Network." While the '411 reference employs a one-click method for ordering books via the Internet, the user must interact with the server system in order to purchase the books. However, if the user wants to print anything, such as a copy of a list of the books to be purchased, to use the Web-based imaging printing model, the user must execute the printing steps previously discussed. Consequently, a further advantageous printing system would be presented if a one-click option could be utilized in printing.

It is apparent from the above that there exists a need in the art for a web-based printing system that provides a one-click printing option. It is a purpose of this invention to fulfill this and other needs in the art in a manner more apparent to the skilled artisan once given the following disclosure.

SUMMARY OF THE INVENTION

Generally speaking, this invention fulfills these needs of providing a method for single-action printing, comprising the steps of selecting a document to be printed by a user, accessing a Web imaging homepage, selecting a target printer, executing a single-action printer command, determining which default settings to utilize on the target printer, and printing the document.

In certain preferred embodiments, the document to be printed is composed/selected at a computer by the user. Also, the single-action printer command is performed by clicking with a mouse. Finally, the last settings utilized in the target printer, if it has been previously utilized, are stored in a "cookie."

In another further preferred embodiment, the use of the single-action printing option and cookie allows the user to print the document without continually having to review the printer Web page.

The preferred printing system, according to this invention, offers the following advantages: ease-of-use and increased user efficiency between print jobs. In fact, in many of the preferred embodiments, these factors of ease-of-use and increased user efficiency are optimized to an extent that is considerably higher than heretofore achieved in prior, known Web-based printing systems.

The above and other features of the present invention, which will become more apparent as description proceeds, are best understood by considering the following detailed description in conjunction with the accompanying drawings, wherein like characters represent like parts throughout the several views and in which:

DETAILED DESCRIPTION OF THE INVENTION

Figure 1:
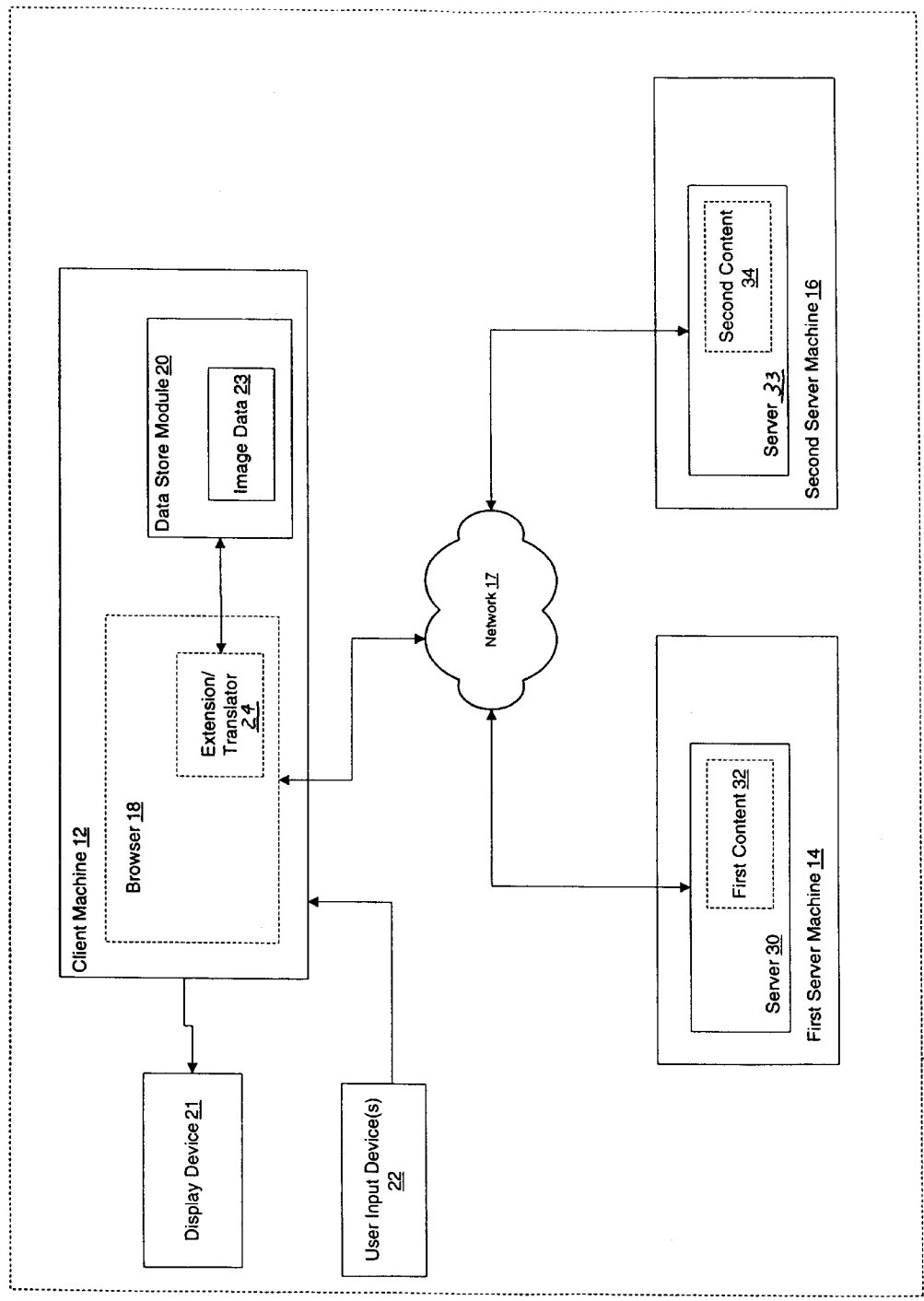
FIG. 1 is a schematic illustration of a Web-based system for processing data in a distributed environment, according to the present invention.

The field of network computers is presently in its infancy. It is expected, however, to evolve rapidly for a number of reasons. For example, it is difficult to imagine the computing power that exists over the INTERNET. In fact, the computing power that is available over the INTERNET is expanding everyday and there is no end in sight. The possibility of providing a personal computer with the ability to make use of even a portion of this computing power would be a tremendous advantage.

Unfortunately, before we can reach this vision of the future there are a number of problems that must be overcome. One major problem that must be overcome involves the ease at which a computer can make use of other devices over a network, such as the INTERNET.

To facilitate a complete understanding of the invention, a glossary of terms and acronyms and a description of several preferred embodiments is provided below: The following terms and acronyms are used throughout the detailed description:

Client-Server. A model of interaction in a distributed system in which a program at one site sends a request to a program at another site and waits for a response. The requesting program is called the "client," and the program that responds to the request is called the "server." In the context of the World Wide Web (discussed below), the client is a "Web browser" (or simply "browser") which runs on a computer of a user; the program which responds to browser requests by serving Web pages, or other types of Web content, is commonly referred to as a "Web server."

Content. A set of executable instructions that is served by a server to a client and which is intended to be executed by the client so as to provide the client with certain functionality. Web content refers to content that is meant to be executed by operation of a Web browser. Web content, therefore, may include (the following is a non-exhaustive list) one or more of the following: HTML code, JavaScript™, Java Program(s) and C-"Sharp" code.

Hyperlink. A navigational link from one document to another, from one portion (or component) of a document to another, or to a Web resource, such as a Java applet. Typically, a hyperlink is displayed as a highlighted word or phrase that can be selected by clicking on it using a mouse to jump to the associated document or document portion or to retrieve a particular resource.

Hypertext System. A computer-based informational system in which documents (and possibly other types of data entities) are linked together via hyperlinks to form a user-navigable "web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations that may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols that may be used in place of (or in addition to) HTML and HTTP.

Web Site. A computer system that provides informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a Web Site can have additional functionality, For example, a Web site may have the ability to print documents, scan documents, etc.

HTML (HyperText-Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (HyperText Transport Protocol). The standard World Wide Web client-server protocol used for the exchange of information (such as HTML documents and client requests for such documents) between a browser and a Web server. HTTP includes a number of different types of messages that can be sent from the client to the server to request different types of server actions. For example, a "GET" message, which has the format GET <URL>, causes the server to return the document or file located at the specified URL.

URL (Uniform Resource Locator). A unique address which fully specifies the location of a file or other resource on the Internet or a network. The general format of a URL is protocol: //machine address:port/path/filename.

With respect to FIG. 1, FIG. 1 provides an architectural diagram illustrating a client-server system 10. Client-server system 10 includes a client machine 12, first server machine 14, and second server machine 16 connected via network 17. It is noted, however, that client-server system 10 may include more that one client machine and one or more than two server machines.

Client machine 12 includes browser 18, storage module 20, display device 21 (e.g., a CRT monitor) and user input device 22 (e.g., a keyboard). It is noted that the storage module 20 may represent any type of data storage device.

Additionally, browser 18 includes extension 24 that provides an interface between Web content executing in browser 18 and storage module 20. Further details regarding the functionality of the extension 24 are provided below.

First server machine 14 includes first server 30. First server 30 can respond to receiving an appropriate request (over network 17) from browser 18 by serving to browser 18 a first Web content 32. Similarly, second server 33 can respond to receiving a request from browser 18 by serving to browser 18 a second Web content 34.

It is important to note that client machine 12, first Web content 32 and second Web content 34 are all in accordance with a system wide standard. This standard specifies "generic access instructions" and "target data".

For purposes of this application, the term "generic access instruction" refers to an executable instruction that is intended to cause the executing device to access a set of target data. A generic access instruction, however, does not include the location of the target data itself. Importantly, the target data is pre-selected (typically by a user) and its location is determined from information that is maintained locally to the executing computer. For this reason, the target data for a particular computer is said to be "associated" with that computer. Thus, the target data that is associated with computer A is the data that computer A will access in response to a generic access instruction. The target data that is associated with computer B is the data that computer B will access in response to the identical generic access instruction.

Furthermore, in the case wherein the target data represents an image, that image is referred to herein as the "target image". In this simplified example, it will be assumed that all generic access instructions specified by the system wide standard mentioned above are for accessing data that describes an image.

Extension 24 is configured to respond to the execution of generic access instructions by generating corresponding (device specific) commands that causes the target data for the client machine 12 to be accessed. How the target data for the client machine 12 is identified is explained below.

It will be understood by a person skilled in the art, after a consideration of this document, that the extension 24 may be implemented by an application programming interface (API). The API being in accordance with the system wide standard mentioned above. Thus, the generic access instructions may cause API calls to be issued to the API in order to affect the data access. It will also be recognized that there are many other ways (both hardware and software) to implement this same functionality. The present invention is not limited to any one way.

Both first Web content 32 and second Web content 34 includes generic access instructions. For illustration purposes, it is assumed that first Web content 32 is for causing a client machine to display the image represented by that machine's local target data. The Web content 34 is for causing a client machine to transmit its target image to a printer for printing.

It is to be understood that the above description relates to the environment we will refer to as Web-based imaging. In fact, the above discussion can be found in greater detail in co-pending, commonly assigned U.S. Patent Application, Hewlett-Packard Docket No. 10003352-1, to S. Simpson et. al., entitled "System and Method for Processing Data in a Distributed Environment", filed on Nov. 13, 2000 and incorporated entirely by reference.

Figure 2:
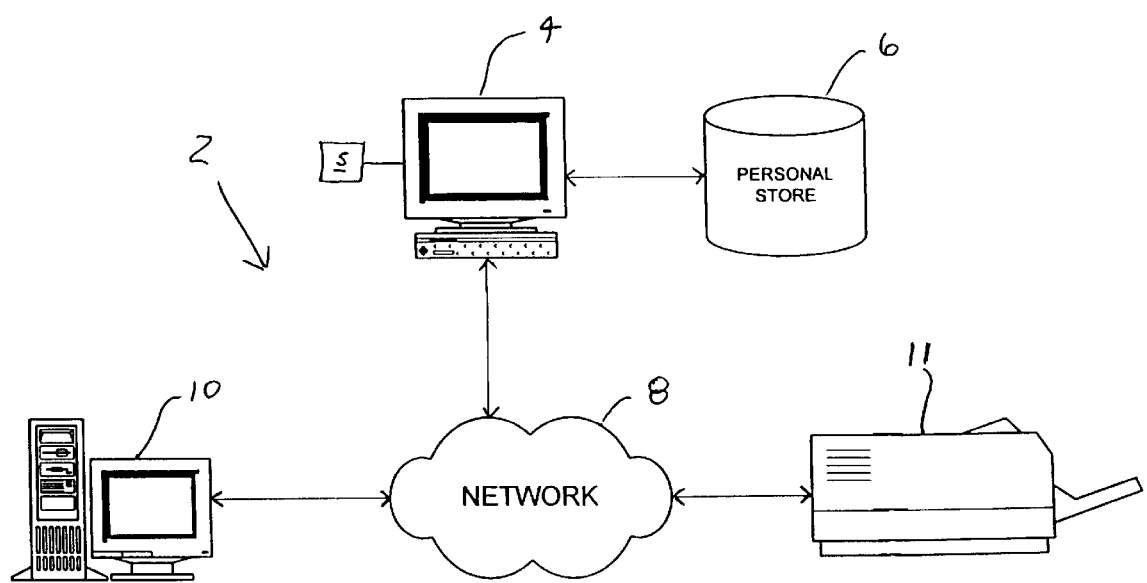
FIG. 2 is a schematic illustration of a Web-based printing system that employs a one-click printing option, according to the present invention.

With reference to FIG. 2, there is illustrated a one preferred embodiment for use of the concepts of this invention. As shown in FIG. 2, printing system 2 is illustrated. Printing system 2 includes, in part, conventional document composing/selecting device 4, cookie 5, conventional data storage device 6, conventional network 8, server 10, and printer 11. Conventional document composing/selecting device 4 can be any suitable device which permits the user to input information that allows a document to be composed and/or selects a document to be printed. Such devices can be, but are not limited to, personal computers (PCs), desktop computers, personal digital assistant devices (PDA), telephonic devices, pagers or the like.

With respect to FIG. 2, a user prepares a document to be printed and/or selects a document to be printed from conventional document composing/selecting device 4. It is to be understood that the user may merely be selecting a document to be printed from the Internet. The document is converted into imaging information by conventional techniques in the document composing/selecting device 4. This imaging information is conventionally stored in a personal storage of data storage device 6. The user then browses through a Web browser (not shown) located on document composing/selecting device 4 to a Web imaging homepage service (FIG. 4) located on server 10 through network 8. This Web-based imaging service (FIG. 4) is responsible for helping the user locate various other Web-based imaging devices, such as printer 11 (List 52 in FIG. 4). If printer 11, for example, is selected to be utilized by the user, server 10 contacts printer 11 and is provided with a link from printer 11 that is forwarded through network 8 to a Web browser (not shown) running on document composing/selecting device 4, as shown in FIG. 5. The user causes printing to be completed on printer 11 through a single-action event on the Web imaging home page (element 50 in FIG. 4) with a conventional activation device (not shown). Such an activation device can be, but is not limited to, a mouse, a graphical user interface (GUI), a voice activated device or the like. For example, the user can click on a mouse when the cursor (not shown) is located over the "print one" button 50 of printer 11 in FIG. 4. The last settings of printer 11 that were employed in printing the document can be remembered and stored in a cookie 5 located in document composing/selecting device 4. Alternatively, cookie 5 could be used to store commonly used default settings rather than the "last used" settings. In this manner, the user does not need to view the printer's Web page shown in FIG. 5. The user merely activates the "print one" button 50 when a document is to be printed.

Figure 3:
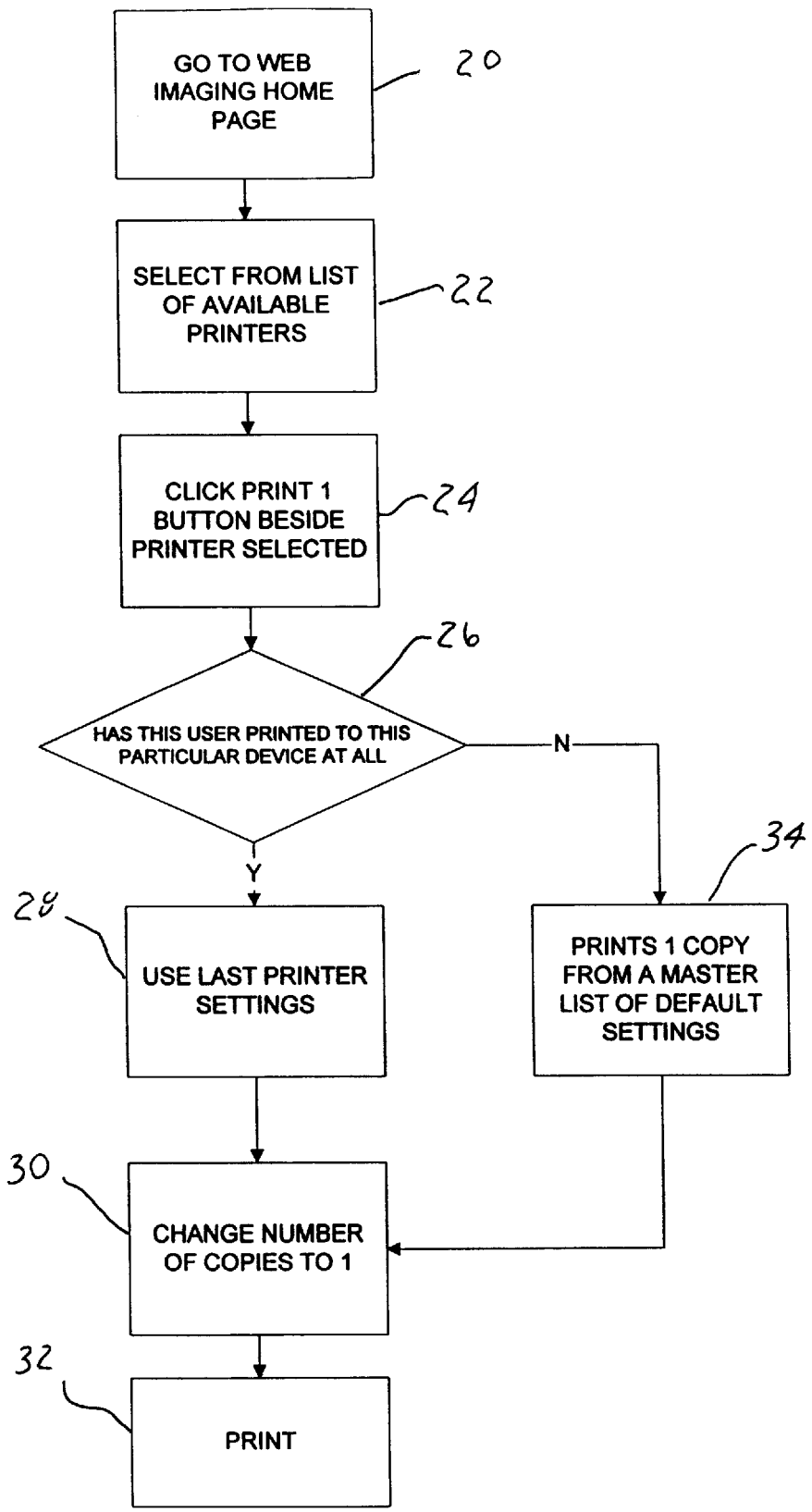
FIG. 3 is a flowchart that illustrates the one-click printing sequence of the present invention.
Figure 4:
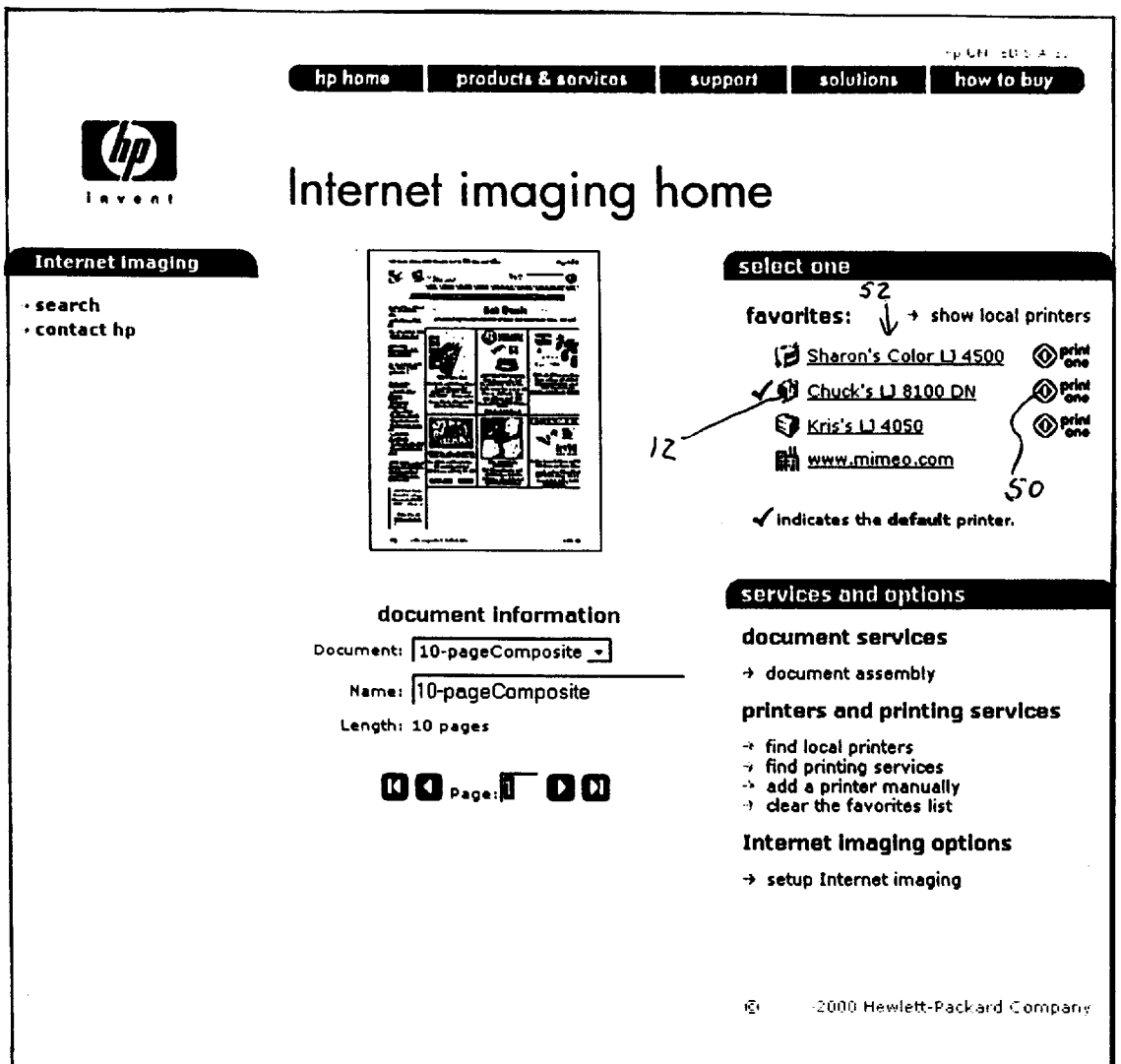
FIG. 4 illustrates the imaging system home page, according to the present invention.
Figure 5:
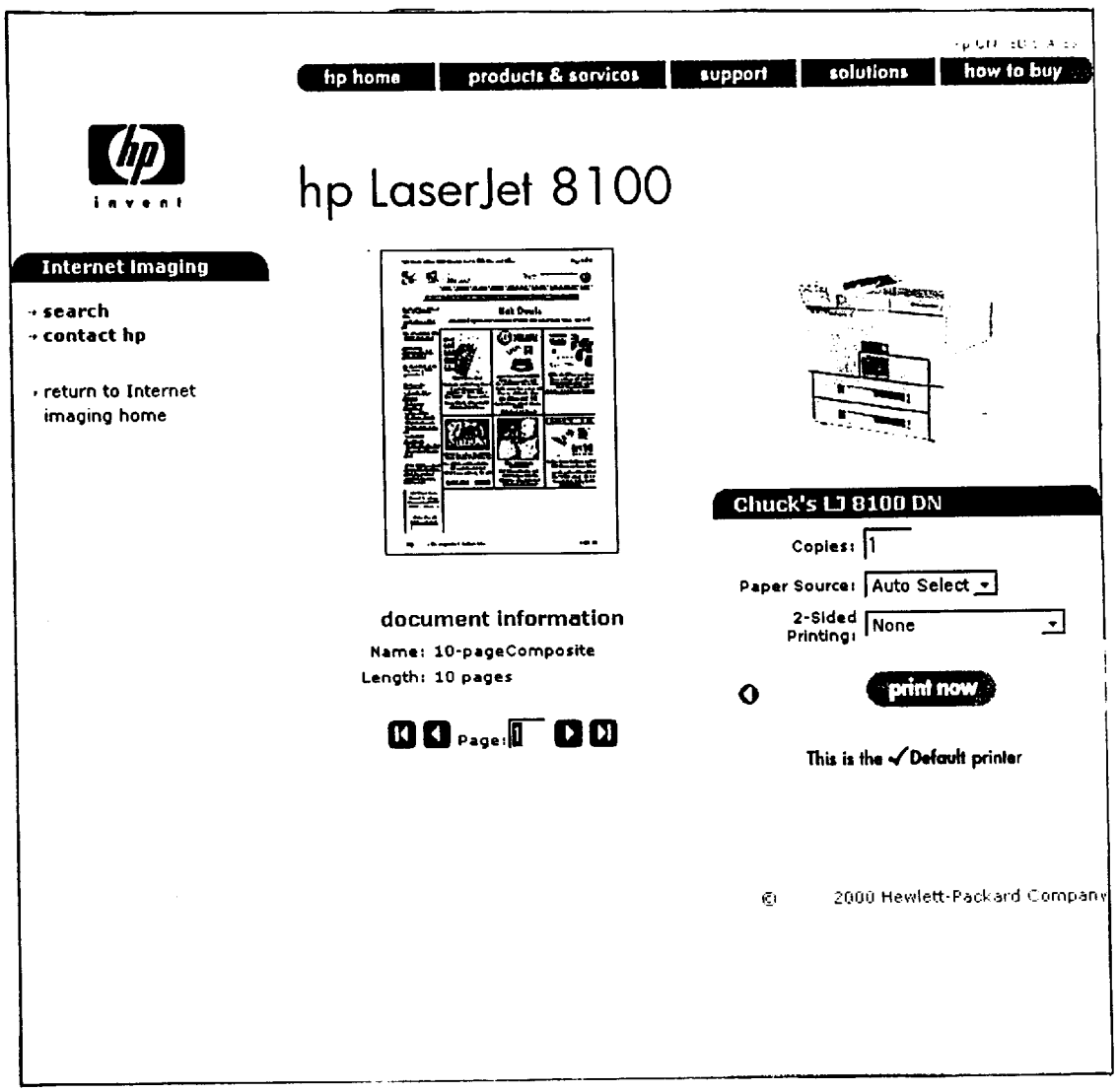
FIG. 5 illustrates the home page for the default printer, according to the present invention.

During the operation of printing system 2, after the user has prepared the document to be printed and/or selects a document to be printed from conventional document composing/selecting device 4, the user goes to the Web imaging homepage, as shown in FIG. 4 and step 20 of FIG. 3. The user then selects from a list (element 52 in FIG. 4) of available printers shown on the Web imaging home page that printer which the user wants the document to be printed upon, as shown in step 22. The selected printer will be referred to as the "target" printer. The user activates the "print one" button 50 located beside the target printer by activating the previously discussed activation device, as shown in step 24. Server 10, along with target printer 11 and network 8, determine whether or not this particular target printer 11 has been utilized by the user, as shown in step 26. If the user has previously utilized target printer 11, the last settings utilized by user on this target printer 11 will be used again to print the document for the user, as shown in step 28 and FIG. 5. These last settings are located in cookie 5 in document composing/selecting device 4. However, unless the user wishes otherwise, printer 11 will then print one copy of the document, as shown in steps 30 and 32.

Figure 6:
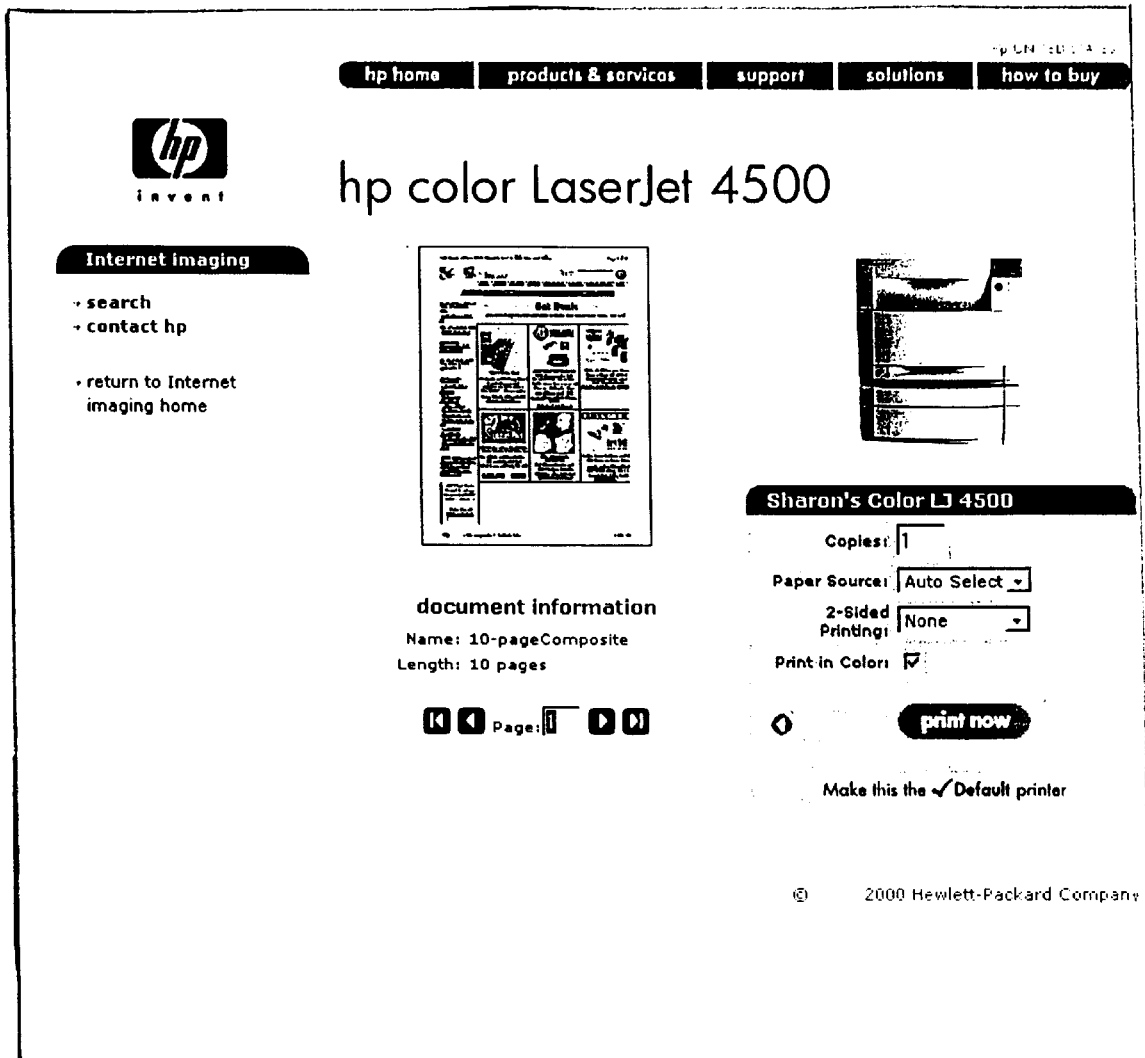
FIG. 6 illustrates the home page for a printer that is not the default printer.

If target printer 11 has not been previously utilized by the user, then printer 11 will print one copy of the document based upon a conventionally determined master list of default settings, as shown in step 34 and FIG. 6. In another embodiment, the "Print One" function could be configured to always use the preconfigured default settings, rather then the last settings.

While printer 11 is referred to as a target printer 11, it is to be understood that any suitable document imaging device could be utilized. For example, a facsimile machine, a photocopier or the like could be used as the "target" printer 11. The phrase "target" refers to that document imaging device which the user is going to image the document onto.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for single-action printing, comprising the steps of:

selecting a document to be printed by a user;

accessing a Web imaging home page;

selecting a target printer;

executing a single-action printer command;

determining which default settings to utilize on said target printer, wherein said step of determining which default settings to utilize on said target printer is further comprised of the step of; utilizing a last setting of said target printer, wherein said last setting of said target printer is stored in a cookie located in a document composing/selecting means, and printing said document.

2. The method, as in claim 1, wherein said step of selecting a document to be printed by said user, is further comprised of the step of:

composing a document.

3. The method, as in claim 1, wherein said step of selecting a target printer is further comprised of the steps of:

obtaining a list of available printers; and selecting said target printer.

4. The method, as in claim 1, wherein said step of executing a single-action printer command is further comprised of the step of:

clicking one time with a mouse.

5. The method, as in claim 1, wherein said step of determining which default settings to utilize on said target printer is further comprised of the step of: employing a master list of default settings developed for said target printer.

* * * * *